US012691780B2

(12) United States Patent
Bae et al.

(10) Patent No.: US 12,691,780 B2
(45) Date of Patent: Jul. 28, 2026

(54) BATTERY CHARGING SERVICE SYSTEM FOR ELECTRIFICATION VEHICLE AND METHOD THEREOF

(71) Applicants:HYUNDAI MOTOR COMPANY, Seoul (KR); Kia Corporation, Seoul (KR)

(72) Inventors: Jun Hyeok Bae, Ulsan (KR); Do Kyoung Ji, Ulsan (KR); Jong Min Park, Ulsan (KR); Won Woo Shin, Pohang-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 1021 days.

(21) Appl. No.: 17/856,730

(22) Filed: Jul. 1, 2022

(65) Prior Publication Data

US 2023/0078886 A1 Mar. 16, 2023

(30) Foreign Application Priority Data

Sep. 16, 2021 (KR) ........................ 10-2021-0124151

(51) Int. Cl.
| | |
|---|---|
| *B60L 53/65* | (2019.01) |
| *B60L 53/16* | (2019.01) |
| *B60L 53/53* | (2019.01) |
| *B60L 53/57* | (2019.01) |
| *B60L 53/66* | (2019.01) |
| *B60L 53/68* | (2019.01) |
| *H02J 7/34* | (2006.01) |

(52) U.S. Cl.
CPC ............... *B60L 53/65* (2019.02); *B60L 53/16* (2019.02); *B60L 53/53* (2019.02); *B60L 53/57* (2019.02); *B60L 53/66* (2019.02); *B60L 53/68* (2019.02); *H02J 7/342* (2020.01)

(58) Field of Classification Search
CPC ...................................................... B60L 53/65
USPC .......................................................... 320/109
See application file for complete search history.

(56) References Cited

U.S. PATENT DOCUMENTS

| | | | | |
|---|---|---|---|---|
| 7,602,143 B2 * | 10/2009 | Capizzo | .................... | G07F 7/06 320/109 |
| 8,922,163 B2 * | 12/2014 | Macdonald | ............. | A47F 10/00 320/109 |
| 2020/0009978 A1 * | 1/2020 | Shin | ...................... | H02J 7/0045 |
| 2020/0086754 A1 * | 3/2020 | Hou | ...................... | H02J 7/0042 |
| 2021/0039513 A1 * | 2/2021 | Konrardy | ........ | B60W 30/18163 |
| 2022/0118878 A1 * | 4/2022 | Kwapisz | ................ | B60L 50/60 |

* cited by examiner

*Primary Examiner* — Jerry D Robbins
(74) *Attorney, Agent, or Firm* — Morgan, Lewis & Bockius LLP

(57) ABSTRACT

A battery charging service system for an electrification vehicle and a method thereof are provided. The battery charging service system includes a mobile charger including at least one energy storage system (ESS), a working device that provides a battery charging service using the mobile charger, and a service device connected with the working device over a network. The service device collects a position and a remaining battery capacity of a user's vehicle, classifies a target vehicle which needs battery charging in a service area based on the position and the remaining battery capacity of the user's vehicle, and transmits a work instruction to the working device taking charge of the service area.

18 Claims, 12 Drawing Sheets

START

RECEIVE WORK INSTRUCTION ———S200

LOAD MOBILE CHARGER ———S205

OBTAIN AUTHORITY TO
OPEN AND CLOSE CHARGING
PORT OF TARGET VEHICLE ———S210

A

BATTERY CHARGING SERVICE SYSTEM FOR ELECTRIFICATION VEHICLE AND METHOD THEREOF

CROSS-REFERENCE TO RELATED APPLICATION

This application claims the benefit of priority to Korean Patent Application No. 10-2021-0124151, filed in the Korean Intellectual Property Office on Sep. 16, 2021, the entire contents of which are incorporated herein by reference.

TECHNICAL FIELD

The present disclosure relates to a battery charging service system for an electrification vehicle and a method thereof.

BACKGROUND

As the demand for electrification vehicles such as electric vehicles is rapidly increasing as environmental problems are emerging around the world, user charging inconvenience and lack of charging infrastructure are becoming social issues. In an existing technology, as a user directly connects a charging socket of the vehicle to a connector of a power supply, charging is performed. Because battery charging of electrification vehicles takes 4 to 5 hours at slow speed and 35 minutes at rapid speed, compared to internal combustion engine vehicles capable of being fully charged within 1 to 2 minutes, charging burden is high for many users, thus causing many users to experience low battery anxiety. Furthermore, due to lack of charging infrastructure, the user should wait for charging when charging the vehicle battery and should move and park the vehicle after charging the vehicle.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a battery charging service system for an electrification vehicle to provide a service for charging the battery of the electrification vehicle using an energy storage system (ESS) and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery charging service system for an electrification vehicle may include a mobile charger including at least one energy storage system (ESS), a working device that provides a battery charging service using the mobile charger, and a service device connected with the working device over a network. The service device may collect a position and remaining battery capacity of a user's vehicle, may classify a target vehicle which needs battery charging in a service area based on the position and the remaining battery capacity of the user's vehicle, and may transmit a work instruction to the working device taking charge of the service area.

The service device may divide the service area based on the position and the remaining battery capacity of the user's vehicle.

The service device may transmit a work list including a position, a remaining battery capacity, a charging target value, and a working time of the target vehicle, when transmitting the work instruction.

The working device may record a work result when there is no remaining work after the working device completes charging of the battery of the target vehicle. The working device may transmit the work result to the service device.

The working device may move to a specified power hub depending on the work instruction and may load at least one mobile charger. The working device may differently charge the battery of the target vehicle based on a remaining battery capacity of the target vehicle.

The working device may first charge the target vehicle irrespective of whether the target vehicle is located in the service area, when the remaining battery capacity of the target vehicle is less than a first reference value.

The working device may move to a position of the target vehicle and may charge the battery of the target vehicle when the target vehicle is located in the service area, when the remaining battery capacity of the target vehicle is greater than or equal to the first reference value and is less than a second reference value, and may not charge the battery of the target vehicle when the target vehicle is not located in the service area.

The working device may move to the position of the target vehicle and may charge the battery of the target vehicle when a charging infrastructure is available, when the remaining battery capacity of the target vehicle is greater than or equal to the second reference value and is less than a third reference value, and may not charge the battery of the target vehicle when the charging infrastructure is not available.

The working device may not charge the battery of the target vehicle when the remaining battery capacity of the target vehicle is greater than or equal to the third reference value.

The service device may collect big data about user characteristics including at least one of a driving habit, a driving pattern, a battery usage cycle, a parking position, a parking pattern, or a frequency of battery charging of the user and periodically provides the battery charging service using the collected big data.

According to another aspect of the present disclosure, a battery charging service method for an electrification vehicle may include collecting, by a service device, a position and a remaining battery capacity of a user's vehicle, classifying, by the service device, a target vehicle which needs battery charging in a service area based on the position and the remaining battery capacity of the user's vehicle, transmitting, by the service device, a work instruction to a working device taking charge of the service area, and providing, by the working device, a battery charging service to the target vehicle depending on the work instruction.

The classifying of the target vehicle may include dividing the service area based on the position and the remaining battery capacity of the user's vehicle.

The transmitting of the work instruction may include transmitting a work list including a position, a remaining battery capacity, a charging target value, and a working time of the target vehicle.

The providing of the battery charging service may include recording, by the working device, a work result, when there is no remaining work after completing charging of the battery of the target vehicle and transmitting, by the working device, the work result to the service device.

The providing of the battery charging service may include moving, by the working device, to a specified power hub depending on the work instruction and loading, by the working device, at least one mobile charger and differently charging, by the working device, the battery of the target vehicle based on a remaining battery capacity of the target vehicle.

The charging of the battery of the target vehicle may include first charging the target vehicle irrespective of whether the target vehicle is located in the service area, when the remaining battery capacity of the target vehicle is less than a first reference value.

The charging of the battery of the target vehicle may further include moving to a position of the target vehicle and charging the battery of the target vehicle when the target vehicle is located in the service area, when the remaining battery capacity of the target vehicle is greater than or equal to the first reference value e and is less than a second reference value, and not charging the battery of the target vehicle when the target vehicle is not located in the service area.

The charging of the battery of the target vehicle may further include moving to the position of the target vehicle and charging the battery of the target vehicle when a charging infrastructure is available, when the remaining battery capacity of the target vehicle is greater than or equal to the second reference value and is less than a third reference value, and not charging the battery of the target vehicle when the charging infrastructure is not available.

The charging of the battery of the target vehicle may further include not charging the battery of the target vehicle when the remaining battery capacity of the target vehicle is greater than or equal to the third reference value.

The battery charging service method may further include collecting big data about user characteristics including at least one of a driving habit, a driving pattern, a battery usage cycle, a parking position, a parking pattern, or a frequency of battery charging of the user and periodically providing the battery charging service using the collected big data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
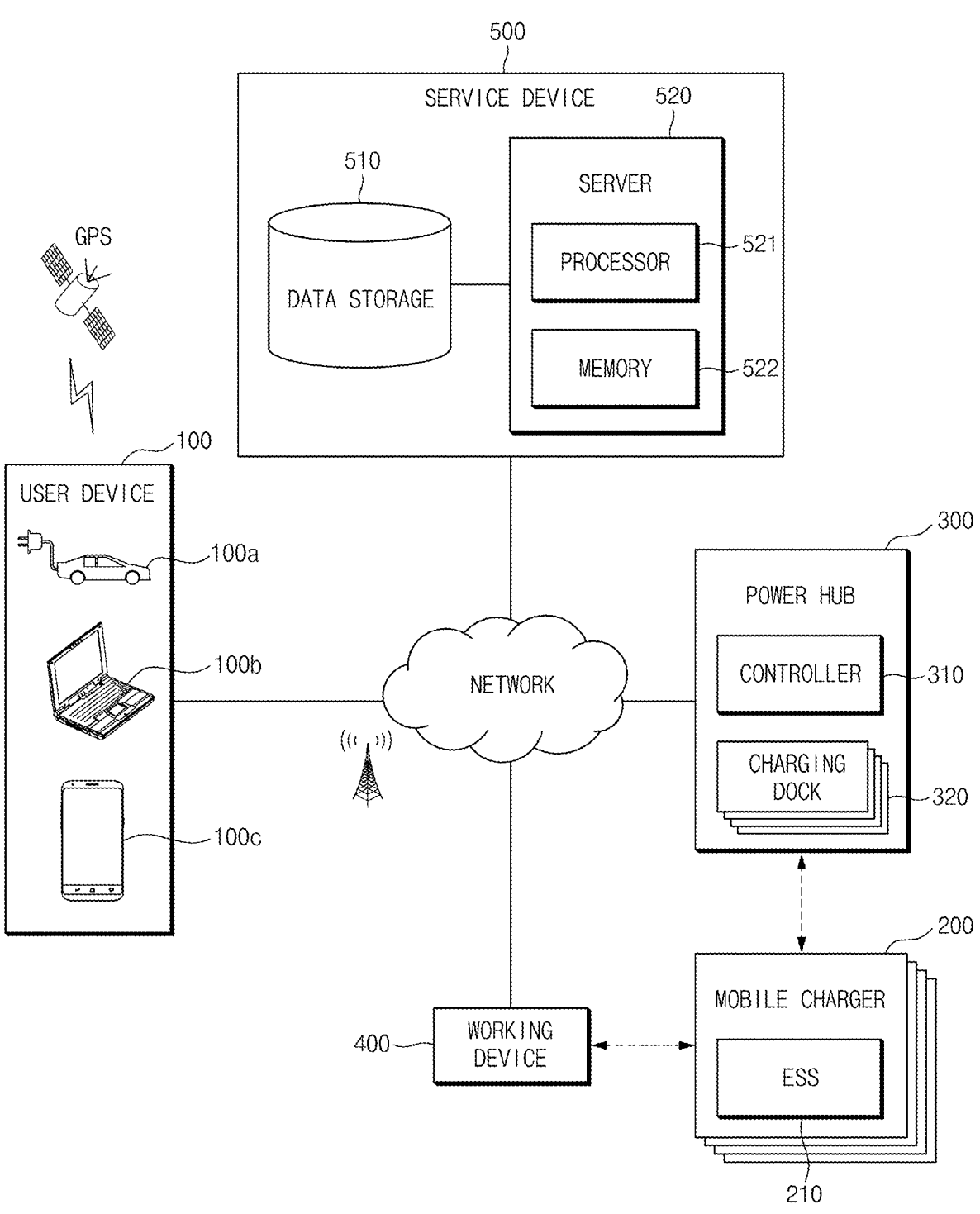
FIG. 1 is a block diagram illustrating a configuration of a battery charging service system for an electrification vehicle according to exemplary embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure may propose a charging service model for monitoring a battery state of charge (SOC) of a user vehicle to analyze a vehicle driving pattern and charging the battery of the user vehicle on behalf of a user using a mobile charger including an energy storage system (ESS) based on the analyzed vehicle driving pattern to resolve charging inconvenience of the user who uses an electrification vehicle.

FIG. 1 is a block diagram illustrating a configuration of a battery charging service system for an electrification vehicle according to exemplary embodiments of the present disclosure.

Referring to FIG. 1, the battery charging service system for the electrification vehicle may include a user device 100, a mobile charger 200, a power hub 300, a working device 400, and a service device 500, which are connected over a network. The network may include a wired network, such as a local area network (LAN), a wide area network (WAN), an Ethernet, and/or an integrated services digital network (ISDN), and/or a wireless network, such as a wireless Internet (e.g., wireless-fidelity (Wi-Fi)), short range communication (e.g., near field communication (NFC), Bluetooth, ZigBee, and infrared data association (IrDA)), and mobile communication. Each of the user device 100, the mobile charger 200, the power hub 300, the working device 400, and the service device 500 may include a communication circuit and may communicate with an external electronic device connected to the wired network and/or the wireless network using the communication circuit.

The user device 100 may be an electronic device available to a user which possesses an electrification vehicle (hereinafter, referred to as a "vehicle"), which may be, for example, a vehicle terminal 100a, a laptop 100b, a smartphone 100c, and/or the like. The user device 100 may measure a vehicle position using a signal transmitted from a global positioning system (GPS) satellite. The user device 100 may obtain a vehicle position by means of another user device 100a, 100b, or 100c communicable with the GPS satellite. For example, the smartphone 100c may obtain a vehicle position through wireless communication with the vehicle terminal 100a.

Furthermore, the user device 100 may obtain vehicle-related information such as a position of the vehicle (or a vehicle position), a battery SOC (or a remaining battery capacity, a battery charge rate, or the like), a driving pattern, and/or security authority (e.g., the authority to open and close a charging port cover and/or the authority to open and close a door). The user device 100 may perform wired or wireless communication with the vehicle terminal 100a or an electronic control unit (ECU) in the vehicle to obtain vehicle-related information.

The mobile charger 200 may include at least one ESS 210 which stores electric energy. The ESS 210 may be a secondary battery such as a 70 Kwh lithium-ion battery, a lithium polymer battery, and/or the like. The ESS 210 may be a reusable waste battery of the electrification vehicle.

The power hub 300 may charge the ESS 210 of the mobile charger 200 using power produced by thermal power generation and/or eco-friendly power generation (e.g., hydrogen fuel cell power generation or the like). Furthermore, the power hub 300 may charge the ESS 210 using midnight electricity to resolve the imbalance between power supply and demand. The power hub 300 may include a controller 310 and a plurality of charging docks 320. The controller 310 may include at least one processor, a memory, a communication circuit, and the like. When the ESS 210 is connected to the charging dock 320, the controller 310 may control charging of the ESS 210. Furthermore, the controller 310 may manage the mobile charger 200 and/or the ESS 210.

Furthermore, the power hub 300 may include a space (e.g., a warehouse or the like) for storing and managing the mobile charger 200 and/or the ESS 210. The power hub 300 may include a device (e.g., an articulated robot or the like) for loading or unloading the mobile charger 200 on or from the working device 400 or loading or unloading the ESS 210 on or from the mobile charger 200.

The working device 400 may play a role in substantially providing a vehicle battery service. The working device 400 may include a loading space capable of loading the at least one mobile charger 200. The working device 400 may move to a position where a charging target vehicle (hereinafter, referred to as a "target vehicle") is parked through autonomous driving. The working device 400 may move to the position where the target vehicle is parked to charge the battery of the target vehicle using the mobile charger 200.

The working device 400 may receive a work instruction transmitted from the service device 500. A work list, a work priority, a service area, an assigned power hub, the loaded number of ESSs, and/or the like may be included in the work instruction. The work list may include identification information of the target vehicle (e.g., a vehicle number and/or a vehicle identification number), a vehicle position, a charging target value, a working time, and/or the like. The working device 400 may move to the power hub 300 depending on the work instruction to load the mobile charger 200 and the ESS 210 and may move to a service area to provide a battery charging service to the target vehicle.

The working device 400 may complete all works and may transmit the work result to the user device 100, the power hub 300, and/or the service device 500 directly or through the mobile charger 200.

The service device 500 may provide a service in the form of an Internet platform, an application (APP), and/or the like. The service device 500 may include a data storage 510, a server 520, and the like. The data storage 510 may store service user information, a vehicle position of the service user, a remaining battery capacity, a vehicle driving pattern, and/or the like in a database. The server 520 may include a processor 521, a memory 522, and the like. The memory 522 may be a non-transitory storage medium which stores instructions executed by the processor 521 and may store input data and/or output data. The memory 522 may include a battery management system, a telematics system, and/or the like. The telematics system may use a system ensured in advance for each car brand.

The processor 521 of the service device 500 may communicate with the user device 100 to collect vehicle-related information including a vehicle position of a user registered as a service user, a remaining battery capacity, and the like. The processor 521 may receive the vehicle-related information transmitted from the user device 100 in real time.

The processor 521 may classify a target vehicle for each service area based on the received vehicle-related information. The service area (hereinafter, referred to as an "area") may be determined in advance or may be determined based on distribution of target vehicles. The target vehicle may be a vehicle where a remaining battery capacity is less than a predetermined reference value among vehicles which use a charging service.

The processor 521 may manage a charging situation of the ESS 210 through communication with the power hub 300. When the target vehicle for each area is classified, the processor 521 may instruct the power hub 300 to perform a preparation work for unloading the mobile charger 200. Furthermore, the processor 521 may assign (or allocate) the working device 400 for each area and may transmit a work instruction to the working device 400.

The processor 521 may receive a work result (or work data) from the working device 400. The processor 521 may transmit a charged result to the user device 100 based on the received work result. Furthermore, the processor 521 may collect big data about user characteristics and may store and manage the collected big data. The big data about the user characteristics may include a driving habit, a driving pattern, a battery usage cycle, a parking position, a parking pattern, the frequency of battery charging, and/or the like of the user. The processor 521 may periodically provide a charging service using the collected big data.

Figure 2:
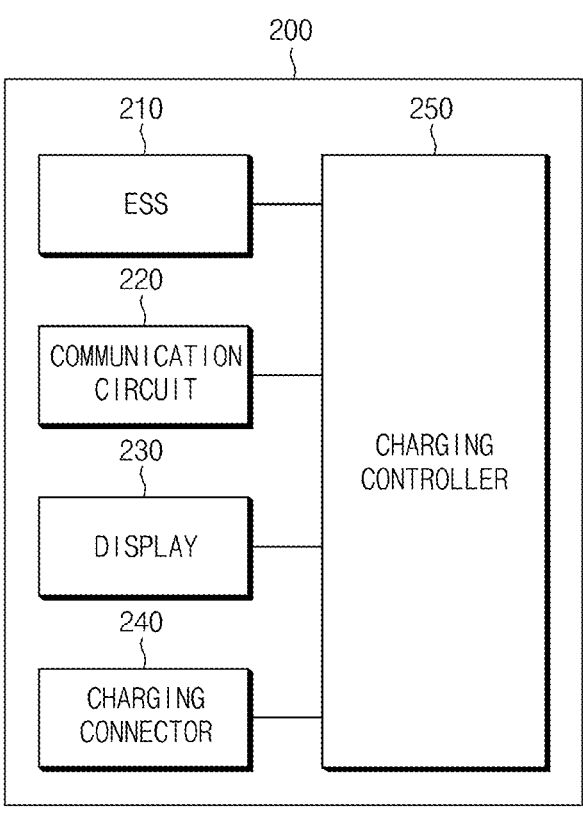
FIG. 2 is a block diagram illustrating a configuration of a mobile charger according to exemplary embodiments of the present disclosure.

FIG. 2 is a block diagram illustrating a configuration of a mobile charger according to exemplary embodiments of the present disclosure.

A mobile charger 200 may include an ESS 210, a communication circuit 220, a display 230, a charging connector 240, a charging controller 250, and the like.

The ESS 210 may store electric energy. The at least one ESS 210 may be loaded on the mobile charger 200.

The communication circuit 220 may assist the mobile charger 200 to communicate with an external electronic device such as a user device 100, a power hub 300, a working device 400, and/or a service device 500 of FIG. 1. The communication circuit 220 may transmit billing information (including the amount of charging) according to use of charging depending on an instruction of the charging controller 250.

The display 230 may output a progress state, a result, and the like according to the operation of the mobile charger 200. The display 230 may include a liquid crystal display (LCD), a thin film transistor-LCD (TFT-LCD), an organic light-emitting diode (OLED) display, a touch screen, and/or the like.

The charging connector 240 may be a connection mechanism for connecting with a charging port (or a charging socket) of a target vehicle. When the charging connector 240 and the charging port of the target vehicle are connected to each other, the charging connector 240 may be electrically connected with the charging port. When connected with the ESS 210 through a cable, the charging connector 240 may supply a charging power, supplied from the ESS 210, to the target vehicle. The charging connector 240 may support a fast charging scheme such as DC combo, DC Chademo, and/or AC 3-phase.

The charging controller 250 may supply electric energy stored in the ESS 210 as a charging power to the target vehicle. The charging controller 250 may supply electric energy stored in the ESS 210 as a wired power or a wireless power. The charging controller 250 may monitor a battery SOC while charging the battery of the target vehicle. When the battery SOC arrives at a target value, the charging controller 250 may end the charging. The charging controller 250 may measure and transmit the amount of power supply (or the amount of charging) to the service device 500 for user billing. The charging controller 250 may include at least one processor, a memory, and the like.

Figure 3:
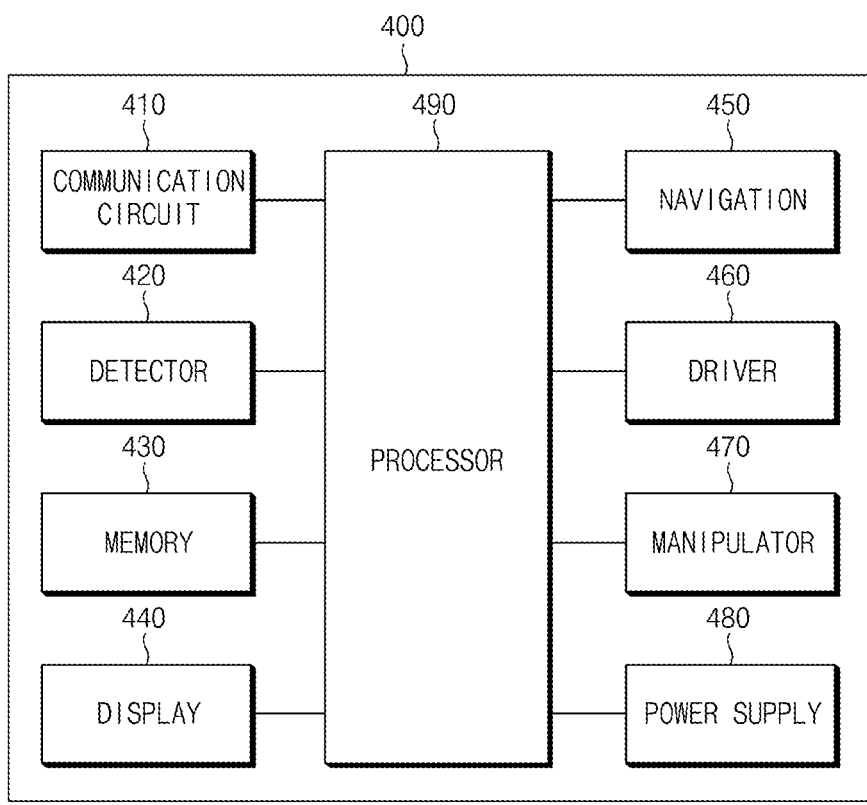
FIG. 3 is a block diagram illustrating a configuration of a working device according to exemplary embodiments of the present disclosure.

FIG. 3 is a block diagram illustrating a configuration of a working device according to exemplary embodiments of the present disclosure.

A working device 400 may include an automated guided vehicle (AGV) and autonomous mobile robots (AMR). Furthermore, the working device 400 may be implemented in the form of coupling the AGV to the AMR. The AMR may handle a work such as a key input, opening and closing of a charging port cover, and/or docking of a charger.

Referring to FIG. 3, the working device 400 may include a communication circuit 410, a detector 420, a memory 430, a display 440, a navigation 450, a driver 460, a manipulator (or an operator) 470, a power supply 480, a processor 490, and the like.

The communication circuit 410 of the working device 400 may perform communication between the working device 400 and an external electronic device such as a mobile charger 200, a power hub 300, and a service device 500 of FIG. 1. The communication circuit 410 may receive a work instruction transmitted from the power hub 300 or the service device 500.

The detector 420 of the working device 400 may detect internal information and external information of the working device 400 using sensors loaded into the working device 400. The sensors may include a vision sensor, an inertial sensor, a distance sensor, a force sensor, and/or the like.

The memory 430 of the working device 400 may be a storage medium which stores instructions executed by the processor 490. The memory 430 may store map data, a driving program, a posture maintenance program, and/or the like. The memory 430 may include at least one of storage media such as a flash memory, a hard disk, a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), an embedded multimedia card (eMMC) and/or a universal flash storage (UFS).

The display 440 of the working device 400 may output a progress state and a result according to the operation of the working device 400. The display 440 may include at least one of a liquid crystal display (LCD), a thin film transistor-liquid crystal display (TFT-LCD), an organic light-emitting diode (OLED) display, a flexible display, a three-dimensional (3D) display, a transparent display, a head-up display (HUD), a touch screen, and a cluster.

The navigation 450 of the working device 400 may generate a driving route of the working device 400 using map data, a positioning device, and/or an object detection device (e.g., a light detection and ranging (LiDAR) system). The navigation 450 may generate a route to a position of a target vehicle with respect to a current position of the working device 400. Although not illustrated in the drawing, a driving control device for moving the working device 400 along the generated route, a related actuator, and the like may be included.

The driver 460 of the working device 400 may control an operation (or driving) of the manipulator 470. The driver 460 may control the manipulator 470 depending on trajectory information generated based on a position of a charging port of the target vehicle to move a charging connector 240 of the mobile charger 200 to the charging port of the target vehicle. The driver 460 may include a motor or the like.

The manipulator 470 of the working device 400 may move the charging connector 240 of the mobile charger 200 to the charging port of the target vehicle and may insert (couple) the charging connector 240 into the charging port. The manipulator 470 may be implemented as an actuator such as a robotic arm and/or a robotic gripper. Furthermore, a camera may be mounted on an end of the manipulator 470 to be used to recognize the charging port of the target vehicle.

The power supply 480 of the working device 400 may supply power necessary for an operation of the working device 400. The power supply 480 may include a portable battery, an embedded battery, and/or the like.

The processor 490 of the working device 400 may control the overall operation of the working device 400. Such a processor 490 may be implemented as at least one of an application specific integrated circuit (ASIC), a digital signal processor (DSP), programmable logic devices (PLD), field programmable gate arrays (FPGAs), a central processing unit (CPU), microcontrollers, or microprocessors.

The processor 490 may move to a parked position of the target vehicle located in a service area assigned to the working device 400 along a movement route (or a driving route) provided from the navigation 450 and may recognize the target vehicle. The processor 490 may recognize the target vehicle based on external information obtained by the detector 420.

The processor 490 may recognize a charging port cover of the target vehicle using the detector 420. The processor 490 may control the driver 460 to move the manipulator 470 to a position of the charging port cover. The processor 490 may verify the authority to open and close the charging port cover through communication with the target vehicle and may open the charging port cover using the manipulator 470 to connect the charging connector 240 to the charging port.

The processor 490 may monitor a battery charging progress situation through communication with the mobile charger 200, while battery charging is performed. When the charging is completed, the processor 490 may control the manipulator 470 to separate the charging connector 240 from the charging port and close the charging port cover.

When the battery charging of the target vehicle is completed, the processor 490 may record the work result in the memory 430. The processor 490 may transmit the work result to an upper device, for example, the service device 500 using the communication circuit 410. Furthermore, the processor 490 may directly transmit the work result to the user device 100.

Figure 4:
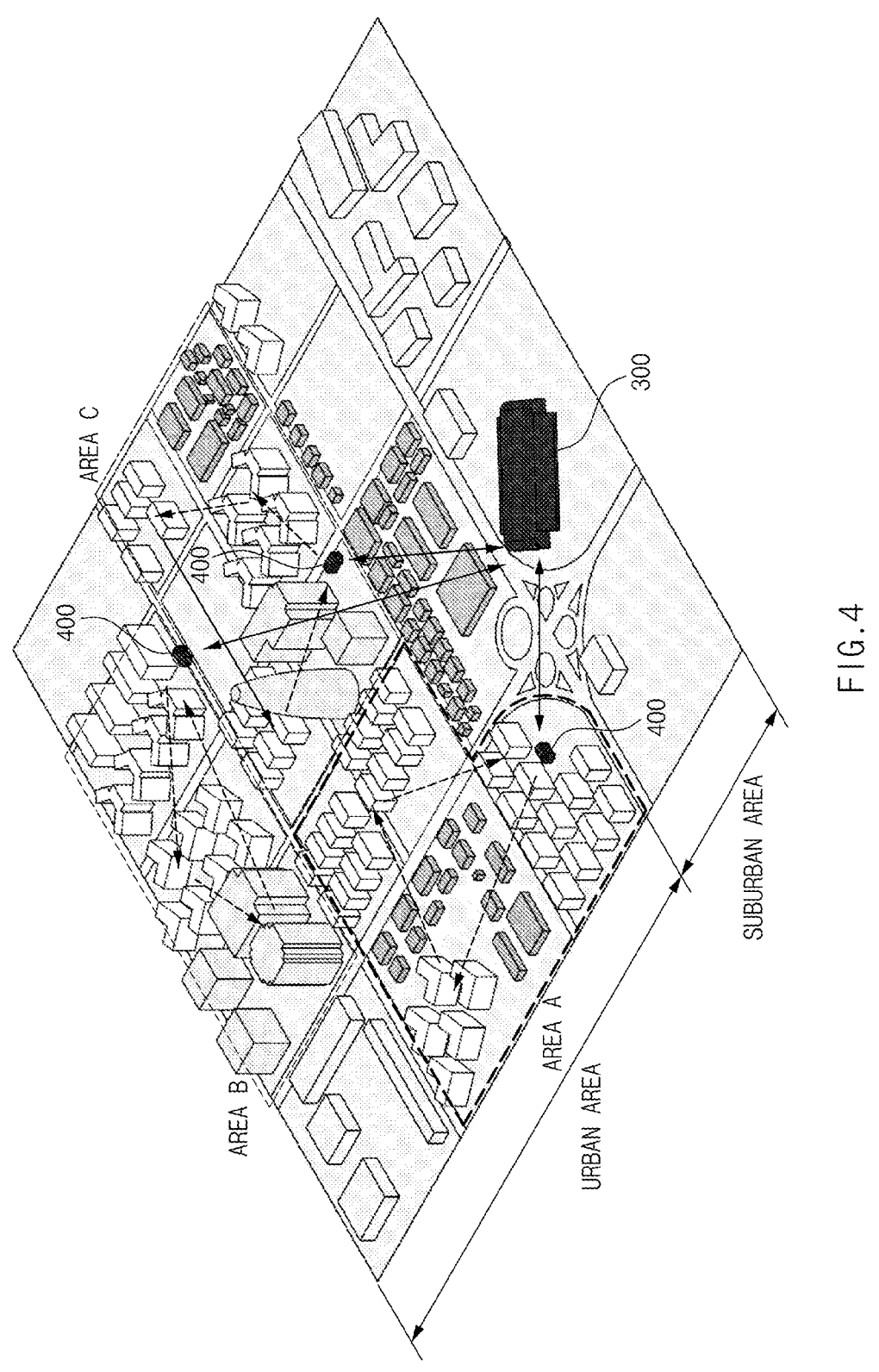
FIG. 4 is a drawing illustrating an example of providing a charging service according to exemplary embodiments of the present disclosure.

FIG. 4 is a drawing illustrating an example of providing a charging service according to exemplary embodiments of the present disclosure.

A power hub 300 may be disposed in a suburban area to provide a charging service in a metropolitan area. The charging service in the metropolitan area may be mainly provided in a large residential area (e.g., a large apartment complex), a large commercial area, a large office area, and the like. A service area in the metropolitan area may be divided based on a position and a remaining battery capacity of a target vehicle. For example, the service area may be divided into area A, area B, and area C based on distribution of target vehicles, each of which has a remaining battery capacity of less than 60%. The working device 400 to be responsible for the charging service for each service area may be assigned, and each working device 400 may provide the charging service to target vehicles in an area in charge.

The working device 400 may load a mobile charger 200 including at least one ESS 210 on the power hub 300 and may move to an area in charge to charge the battery of the target vehicle. The working device 400 may perform an organic service connection, such as area overlap and area sharing, if necessary, by means of intercommunication with another working device.

The working device 400 may complete the charging service and may return to the power hub 300 to prepare for a next service.

Figure 5:
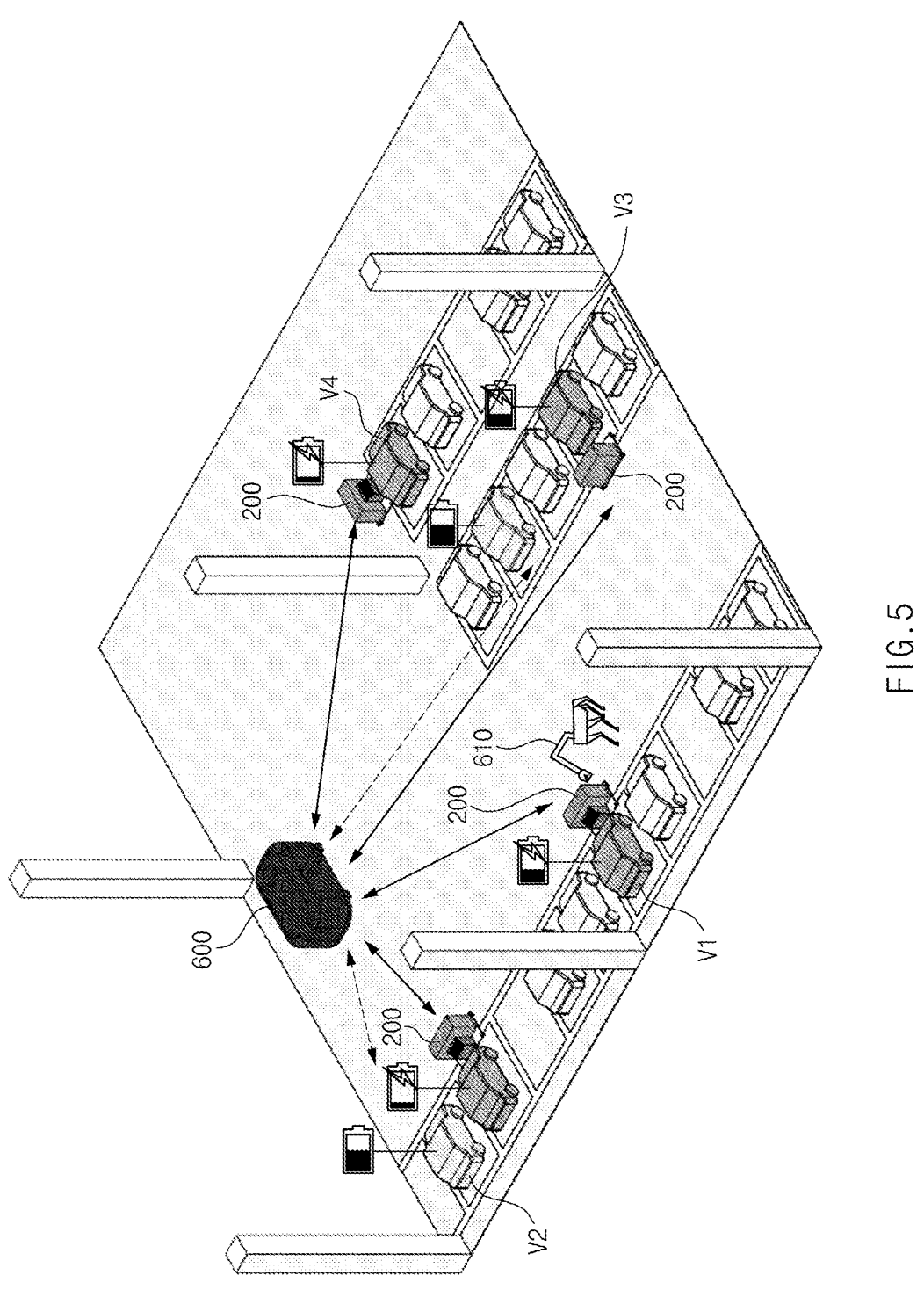
FIG. 5 is a drawing illustrating another example of providing a charging service according to exemplary embodiments of the present disclosure.

FIG. 5 is a drawing illustrating another example of providing a charging service according to exemplary embodiments of the present disclosure.

When the charging service is provided in a parking lot, an automated guided vehicle (AGV) 600 may load a mobile charger 200 including at least one ESS 210 and may move to a predetermined waiting position. When the AGV 600 arrives at the waiting position, a working device 610 may unload the mobile charger 200 from the AGV 600 and may load the mobile charger 200 on a wheel truck to move to a position where a target vehicle is parked.

When there are two or more target vehicles, the working device 610 may first charge the battery of a target vehicle with the highest priority depending on a work priority. For example, as shown in FIG. 5, when there are a plurality of target vehicles V1 to V4 in an area in charge (e.g., a parking lot), the working device 610 may move to a position where the target vehicle V1 with the top priority is parked and may charge the battery of the target vehicle V1. In this case, the working device 610 may open a charging port cover of the target vehicle using the authority to open and close the door, which is provided from a user device 100, and may connect a charging connector 240 of the mobile charger 200 to a charging port to perform a battery charging work.

Figure 6:
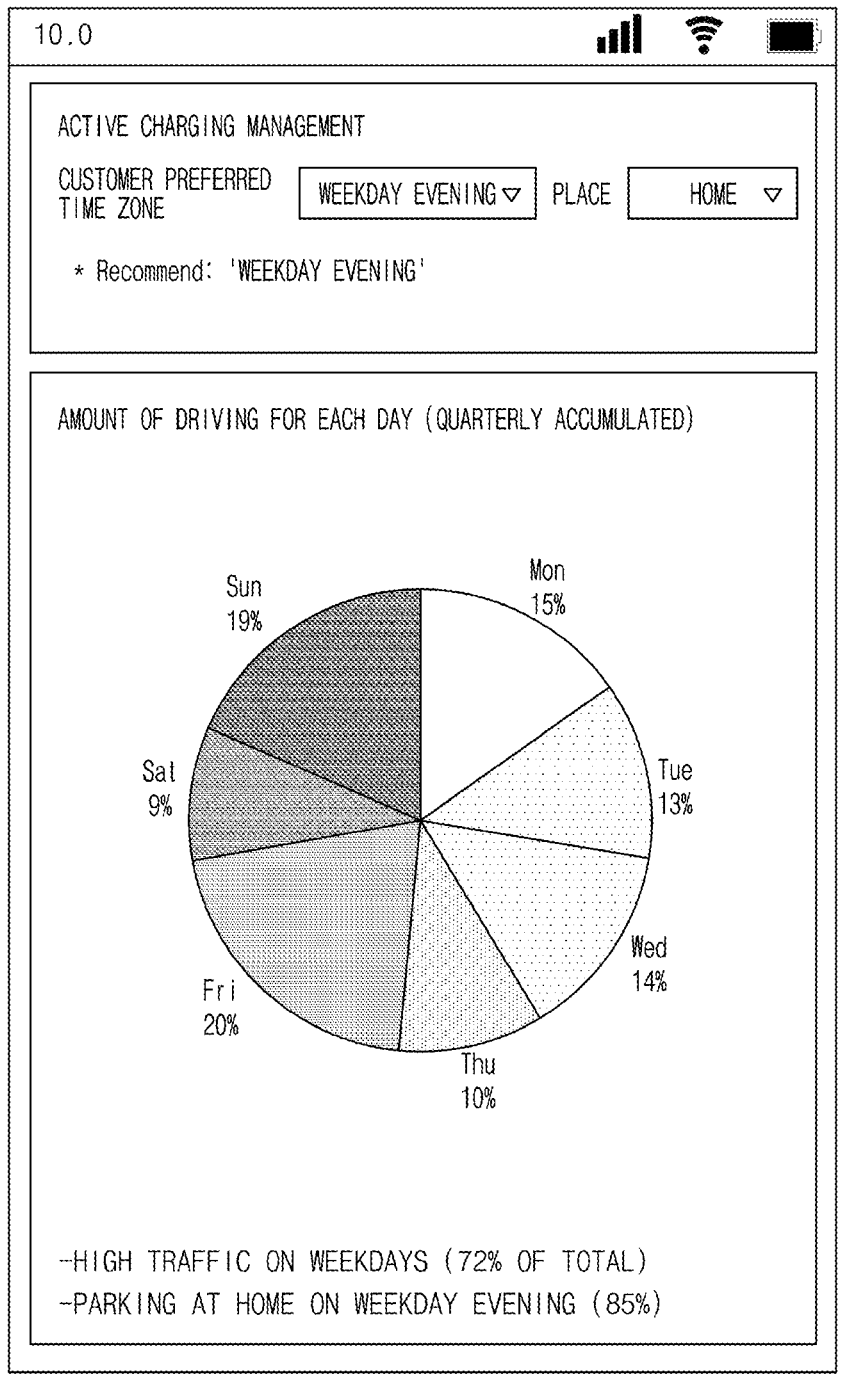
FIG. 6 is a drawing illustrating an active charging management interface screen according to exemplary embodiments of the present disclosure.

FIG. 6 is a drawing illustrating an active charging management interface screen according to exemplary embodiments of the present disclosure.

A service device 500 of FIG. 1 may actively charge and manage the battery of a user vehicle such that a user does not feel the burden of charging. The service device 500 may monitor a position of the user vehicle, a remaining battery capacity of the user vehicle, and the like to analyze a vehicle driving pattern of the user. The service device 500 may transmit result information, such as the amount of driving for each day and a parking pattern, to a user device 100 of FIG. 1 as a result of analyzing the vehicle driving pattern. The user device 100 may display the amount of driving for each day and the parking pattern (e.g., parking at home on a weekday evening), which are provided from the service device 500, on a display screen. Furthermore, the user device 100 may display a charging time zone, a charging place, and the like recommended by the service device 500.

The user device 100 may select and transmit a customer preferred time zone and a customer preferred place of active charging management depending on a user input to the service device 500. The user may select the customer preferred time zone and the customer preferred place of the active charging management with reference to the amount of driving for each day, the parking pattern, and the like. The service device 500 may refer to the preferred time zone and the preferred place when providing the service.

Figure 7:
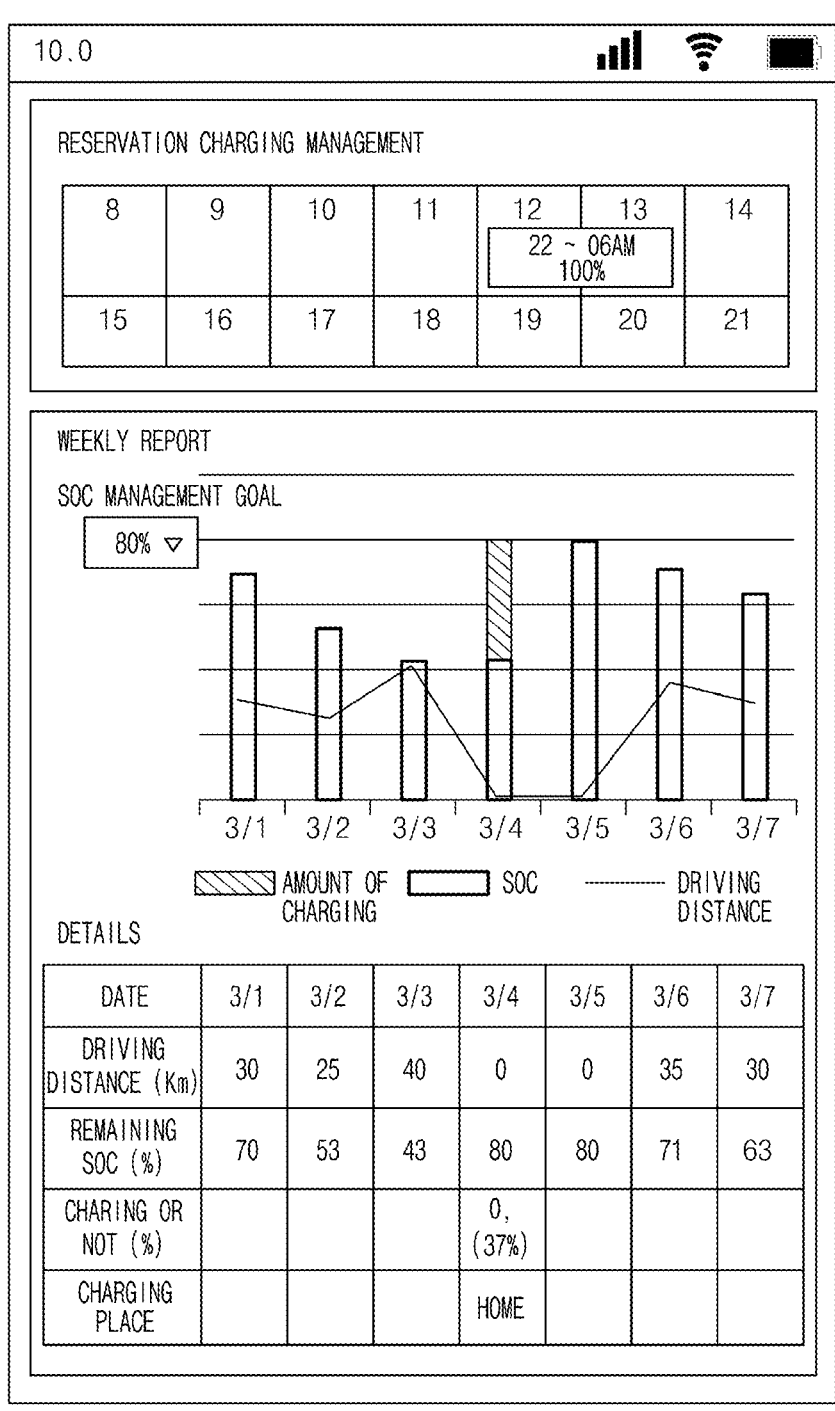
FIG. 7 is a drawing illustrating a reservation charging management interface screen according to exemplary embodiments of the present disclosure.

FIG. 7 is a drawing illustrating a reservation charging management interface screen according to exemplary embodiments of the present disclosure.

Reservation charging management may be a function capable of separately requesting charging urgently or when long-distance driving is planned, except for active charging. Active charging management may be to manage a remaining battery capacity at a predetermined suitable level, for example, a level of 80% due to a state of health (SOH) of the battery, a decrease in charging time, and the like, but the reservation charging management may be to manage a remaining battery capacity at a suitable level or more, when long-distance driving is planned.

A user device 100 of FIG. 1 may display a reservation charging management interface screen on its display. The user device 100 may display a weekly report and reservation charging management on the reservation charging management interface screen. The weekly report may include a driving distance, the amount of battery charging, a state of charge (SOC), charging or not, a charging place, and/or the like. The user device 100 may set an SOC management target value (or a charging target value) depending on a user input. Because the SOC management target value is associated with a charging time, a frequency of charging, and the like, it may be used in conjunction with service billing.

Figure 8:
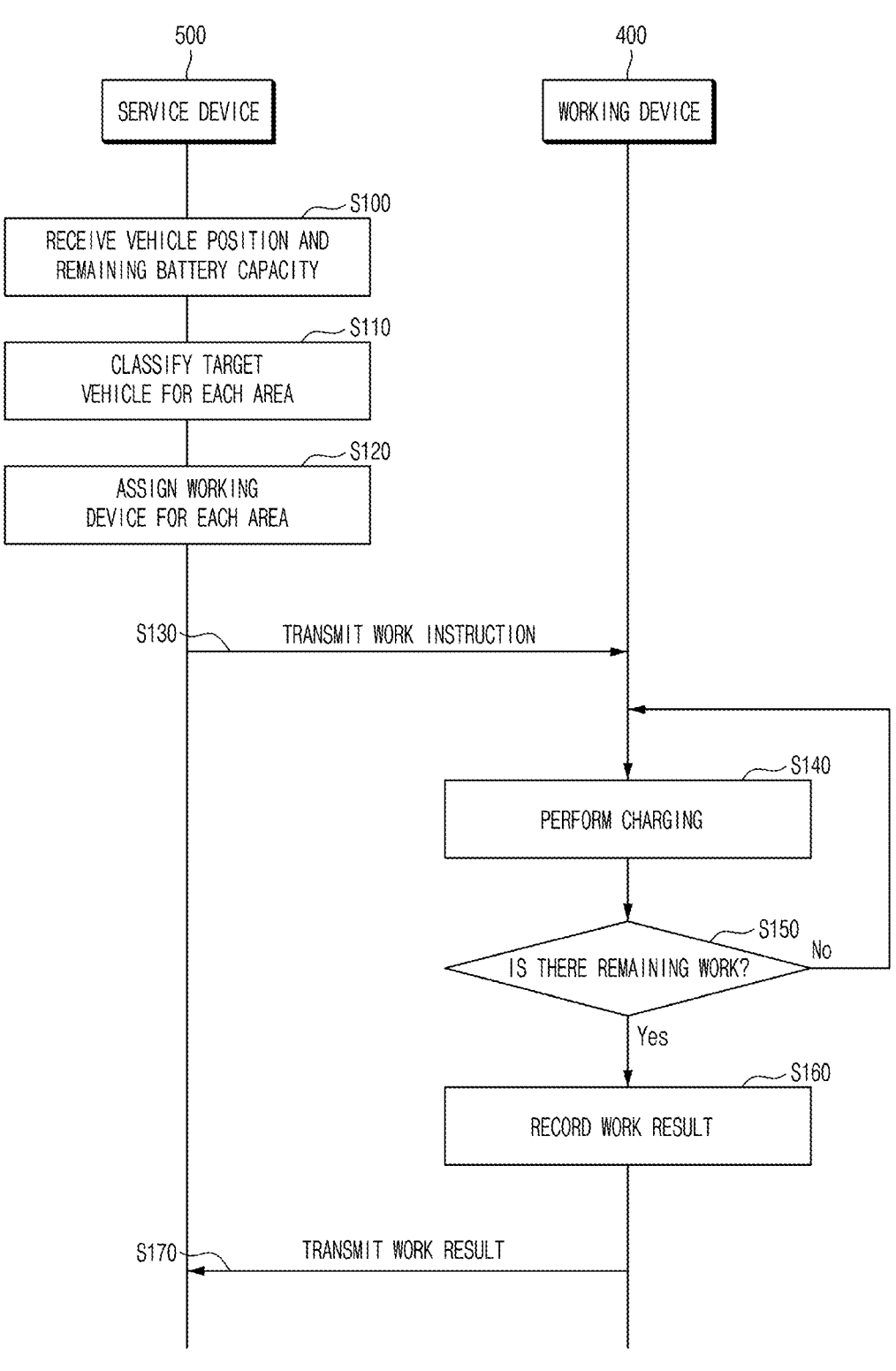
FIG. 8 is a signal sequence diagram illustrating a battery charging service method for an electrification vehicle according to exemplary embodiments of the present disclosure.

FIG. 8 is a signal sequence diagram illustrating a battery charging service method for an electrification vehicle according to exemplary embodiments of the present disclosure.

In S100, a service device 500 may receive a position and a remaining battery capacity of at least one vehicle which uses the service. The service device 500 may receive a vehicle position and a remaining battery capacity from the vehicle which uses the service.

In S110, the service device 500 may classify a target vehicle for each area. The service device 500 may select at least one target vehicle which needs charging among vehicles which use the service and may classify the at least one selected target vehicle for each service area. In this case, the service device 500 may instruct a power hub 300 of FIG.

1 to perform a preparation work for unloading a mobile charger 200 and an ESS 210 of FIG. 1. The service device 500 may manage a charging situation of the ESS 210 in real time through communication with the power hub 300.

In S120, the service device 500 may assign a working device 400 to be responsible for a charging service for each area. The present embodiment describes that the service device 500 assigns the working device 400 to be responsible for a service area, but not limited thereto. The power hub 300 may be implemented to assign the working device 400 to be responsible for the service area.

In S130, the service device 500 may transmit a work instruction. The service device 500 may transmit the work instruction to the working device 400 to be responsible for the service area. A work list, a work priority, a service area, an assigned power hub, the loaded number of ESSs, and/or the like may be included in the work instruction. The work list may include identification information of the target vehicle (e.g., a vehicle number and/or a vehicle identification number), a vehicle position, charging target value, a working time, and/or the like.

When receiving the work instruction, in S140, the working device 400 may charge the battery of the target vehicle in an area in charge. The working device 400 may move to the area in charge to recognize the target vehicle and may provide a battery charging service to the recognized target vehicle. The working device 400 may sequentially perform a work with the highest priority among charging works registered with the work list.

When the battery charging work is completed, in S150, the working device 400 may identify whether there is a remaining work. When there is the remaining work, the working device 400 may move to a position where a next target vehicle is parked to charge the battery of the target vehicle.

When there is no remaining work, in S160, the working device 400 may record the work result. When all the charging works registered with the work list are completed, the working device 400 may record the work result.

In S170, the working device 400 may transmit the work result to the service device 500. The service device 500 may transmit the charged result to a user device 100 mapped to the target vehicle based on the work result.

Figure 9A:
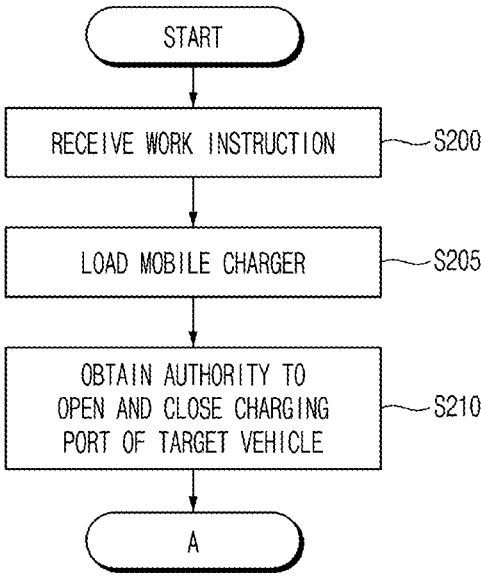
FIGS. 9A and 9B are a flowchart illustrating a battery charging service process of a working device according to exemplary embodiments of the present disclosure.
Figure 9B:
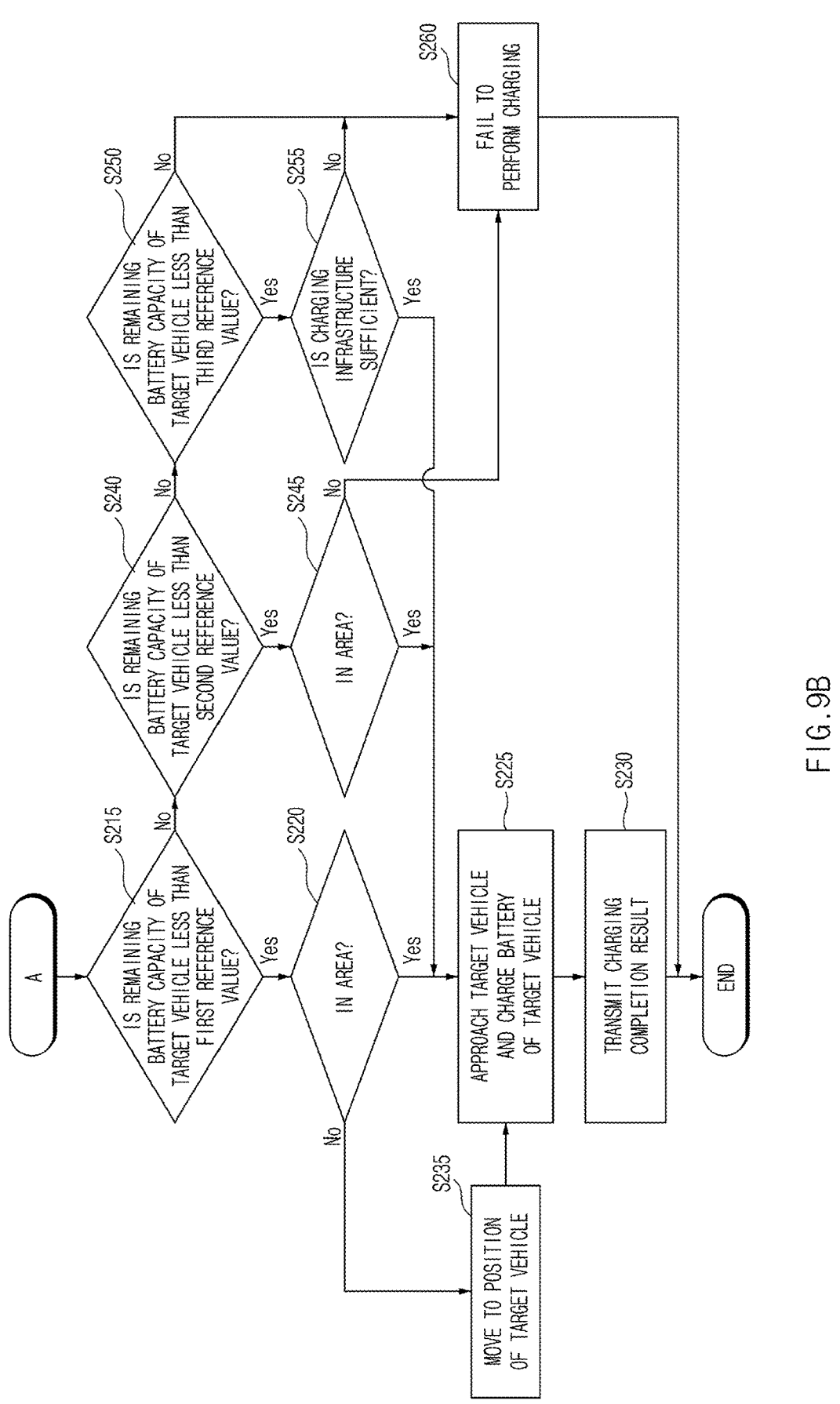

FIGS. 9A and 9B are a flowchart illustrating a battery charging service process of a working device according to exemplary embodiments of the present disclosure.

In S200, a working device 400 of FIG. 1 may receive a work instruction from a service device 500 of FIG. 1. A work list, a work priority, a service area, an assigned power hub, the loaded number of ESSs, and/or the like may be included in the work instruction. The work list may include identification information of the target vehicle (e.g., a vehicle number and/or a vehicle identification number), a vehicle position, a charging target value, a working time, and/or the like.

In S205, the working device 400 may load a mobile charger 200 of FIG. 1 by means of a previously specified power hub 300 of FIG. 1. The power hub 300 may load at least one ESS 210 of FIG. 1 on the mobile charger 200 and may load the at least one mobile charger 200 on the working device 400.

In S210, the working device 400 may obtain the authority to open and close a charging port of a target vehicle. The working device 400 may obtain vehicle control authority, for example, the authority to open and close the charging port, the authority to open and close the door, and/or the like, which is provided from a user device 100 of FIG. 1. In this case, the working device 400 may receive the vehicle control authority from the service device 500.

In S215, the working device 400 may identify whether a remaining battery capacity of the target vehicle is less than a predetermined first reference value (e.g., 20%).

When the remaining battery capacity of the target vehicle is less than the first reference value, in S220, the working device 400 may identify whether the target vehicle is located in an area in charge.

When the target vehicle is located in the area in charge, in S225, the working device 400 may approach the target vehicle and may charge the battery of the target vehicle. The working device 400 may move to a position where the target vehicle is parked in an area in charge to recognize the target vehicle. The working device 400 may open a charging port cover of the recognized target vehicle using the authority to open and close the charging port and may connect a charging connector 240 of the mobile charger 200 to a charging port of the target vehicle to charge the target vehicle.

When the charging of the battery of the target vehicle is completed, in S230, the working device 400 may transmit a charging completion result. The working device 400 may receive the charging work result through communication with the mobile charger 200 and may transmit the received charging work result (or the charging completion result) to the service device 500.

When the target vehicle is not located in the area in charge in S220, in S335, the working device 400 may move to a position of the target vehicle. Thereafter, the working device 400 may perform the operation from S225. For example, when the remaining battery capacity of the target vehicle is less than 20%, the working device 400 may determine that charging is urgent for next driving and may move to the position of the target vehicle irrespective of whether the target vehicle is located in a service area to first charge the battery of the target vehicle.

When the remaining battery capacity of the target vehicle is greater than or equal to the first reference value in S215, in S240, the working device 400 may identify whether the remaining battery capacity of the target vehicle is less than a predetermined second reference value (e.g., 40%).

When the remaining battery capacity of the target vehicle is less than the second reference value, in S245, the working device 400 may identify whether the target vehicle is located in an area in charge.

When the target vehicle is located in the area in charge, in S225, the working device 400 may approach the target vehicle and may charge the battery of the target vehicle. When the charging of the battery of the target vehicle is completed, in S230, the working device 400 may transmit a charging completion result. In other words, when the target vehicle, the remaining battery capacity of which is less than 40%, is located in a service area in charge, the working device 400 may first charge the battery of the target vehicle. When the charging is completed, the working device 400 may transmit a work result, that is, a charging completion result, to an upper device (e.g., the service device 500 or the like) to return to the power hub 300.

When the remaining battery capacity of the target vehicle is greater than or equal to the second reference value in S240, in S250, the working device 400 may identify whether the remaining battery capacity of the target vehicle is less than a predetermined third reference value (e.g., 60%).

When the remaining battery capacity of the target vehicle is less than the third reference value, in S255, the working device 400 may identify whether a charging infrastructure is sufficient. When the charging infrastructure is sufficient, the working device 400 may perform the operation after S225. For example, the working device 400 may selectively charge the battery of the target vehicle based on whether a SOC of the ESS 210 of the target vehicle is sufficient, the remaining battery capacity of which is less than 60%.

When the charging infrastructure is not sufficient, in S260, the working device 400 may not charge the battery of the target vehicle. Furthermore, when the remaining battery capacity of the target vehicle is greater than or equal to a third reference value in S250, in S260, the working device 400 may not charge the battery of the target vehicle. For example, when the remaining battery capacity is greater than or equal to an SOC management target value, the working device 400 may not charge the battery of the target vehicle.

Like the above-mentioned embodiment, the working device 400 may differently provide a battery charging service depending on a remaining battery capacity of the target vehicle. The working device 400 may provide a charging service to maintain a remaining battery capacity at a level of 80% to fast charge the battery and manage a state of health (SOH) of the battery when charging the battery once and may perform more charging depending on a user request.

Figure 10:
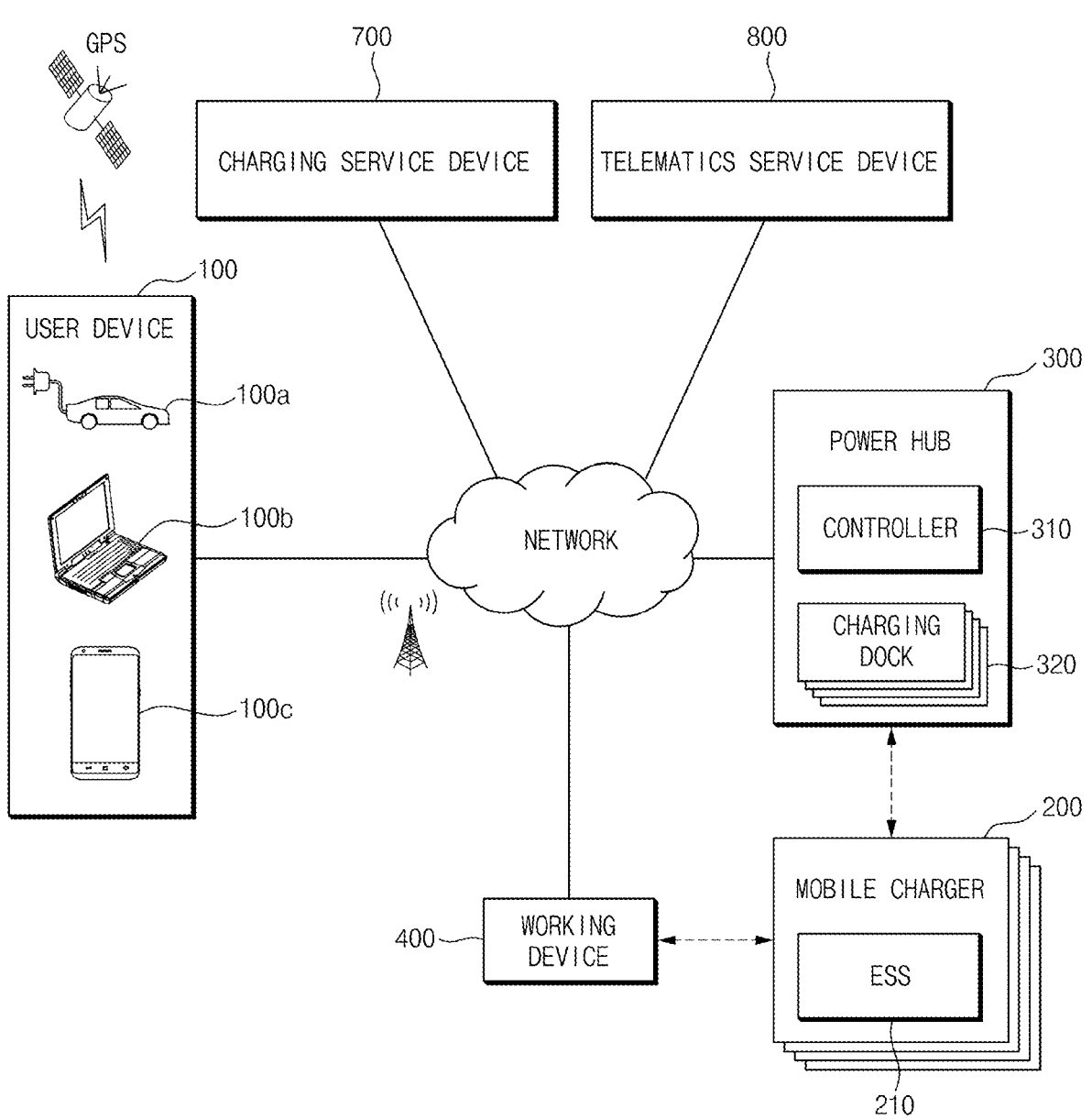
FIG. 10 is a block diagram illustrating a configuration of a battery charging service system for an electrification vehicle according to another exemplary embodiment of the present disclosure.

FIG. 10 is a block diagram illustrating a configuration of a battery charging service system for an electrification vehicle according to another exemplary embodiment of the present disclosure.

In describing the present embodiment, a detailed description of the same components as components of a system disclosed in FIG. 1 will be omitted and only a different component will be described in detail.

Referring to FIG. 10, a battery charging service system for an electrification vehicle may include a user device 100, a mobile charger 200, a power hub 300, a working device 400, a charging service device 700, a telematics service device 800, and the like.

The user device 100 may obtain vehicle-related information such as a vehicle position, a remaining battery capacity, a driving pattern, or security authority and may transmit the obtained vehicle-related information to the telematics service device 800. The mobile charger 200 may include at least one ESS 210 which stores electric energy. The power hub 300 may charge and manage the mobile charger 200 and the ESS 210 loaded on the mobile charger 200. When receiving a work instruction from the charging service device 700, the working device 400 may charge the battery of a target vehicle using the mobile charger 200 depending to the work instruction. The working device 400 may receive vehicle control authority from the telematics service device 800 or the charging service device 700. The vehicle control authority may be provided from the user device 100.

The telematics service device 800 may transmit vehicle-related information received from the user device 100, for example, a vehicle terminal 100*a*, to the charging service device 700. The telematics service device 800 may use a previously constructed telematics service for each vehicle brand.

The charging service device 700 may provide a charging service to the target vehicle which needs battery charging based on the vehicle-related information transmitted from the telematics service device 800. The charging service device 700 may analyze a vehicle driving pattern based on information such as a vehicle position and a remaining battery capacity of the target vehicle (or the vehicle using the service) and may determine a battery charging time zone, a battery charging place, and the like of the target vehicle with reference to the analyzed result to actively provide a battery charging service.

Figure 11:
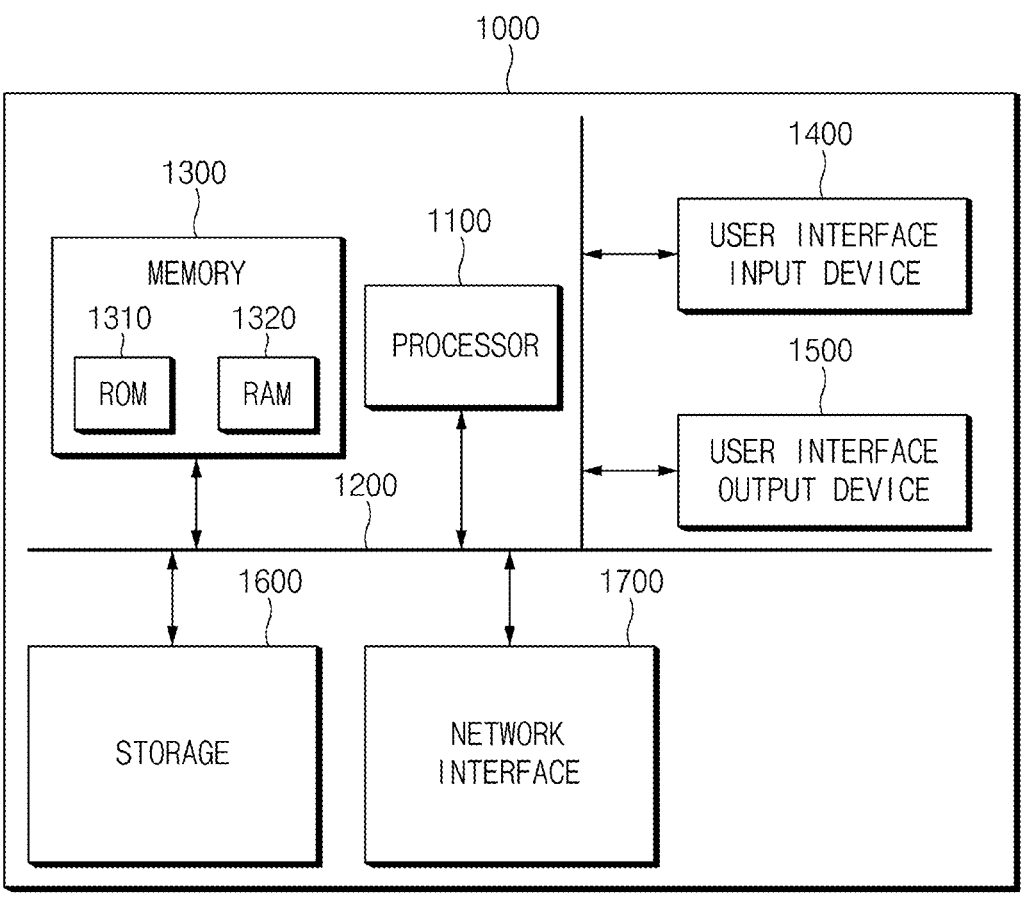
FIG. 11 is a block diagram illustrating a computing system for executing a battery charging service method for an electrification vehicle according to exemplary embodiments of the present disclosure.

FIG. 11 is a block diagram illustrating a computing system for executing a battery charging service method for an electrification vehicle according to exemplary embodiments of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100. The processor 1100 may read information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the battery charging service system may provide a service for charging the battery of an electrification vehicle using an ESS, thus resolving lack of charging infrastructure, inconvenience according to the use of charging infrastructure, and the like.

Furthermore, according to embodiments of the present disclosure, the battery charging service system may extend a state of health of the battery of the electrification vehicle by means of frequent charging considering the characteristics of the vehicle battery, thus reducing maintenance costs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. A battery charging service system for an electrification vehicle, the battery charging service system comprising:
    a mobile charger including at least one energy storage system (ESS);
    a working device configured to provide a battery charging service using the mobile charger; and a service device connected with the working device through a network, wherein the service device is configured to collect information of a position and a remaining battery capacity of a user's vehicle, to classify a target vehicle which needs charging of a battery in a service area based on the collected information of the position and the remaining battery capacity of the user's vehicle, and to transmit a work instruction to the working device taking charge of the service area, and wherein the working device first charges the target vehicle, irrespective of whether the target vehicle is located in the service area, when a remaining battery capacity of the target vehicle is less than a first reference value.

2. The battery charging service system of claim 1, wherein the service device is further configured to divide the service area based on the position and the remaining battery capacity of the user's vehicle.

3. The battery charging service system of claim 1, wherein the service device transmits a work list including a position, the remaining battery capacity, a charging target value, and a working time of the target vehicle, when transmitting the work instruction.

4. The battery charging service system of claim 1, wherein the working device is further configured to record a work result, when there is no remaining work after the working device completes the charging of the battery of the target vehicle, and wherein the working device is further configured to transmit the work result to the service device.

5. The battery charging service system of claim 1, wherein the working device is further configured to move to a specified power hub depending on the work instruction and to load at least one mobile charger, and wherein the working device is further configured to differently charge the battery of the target vehicle based on the remaining battery capacity of the target vehicle.

6. The battery charging service system of claim 5, wherein the working device moves to a position of the target vehicle and charges the battery of the target vehicle when the target vehicle is located in the service area, when the remaining battery capacity of the target vehicle is greater than or equal to the first reference value and is less than a second reference value, and the working device does not charge the battery of the target vehicle when the target vehicle is not located in the service area.

7. The battery charging service system of claim 6, wherein the working device moves to the position of the target vehicle and charges the battery of the target vehicle when a charging infrastructure is available, when the remaining battery capacity of the target vehicle is greater than or equal to the second reference value and is less than a third reference value, and the working device does not charge the battery of the target vehicle when the charging infrastructure is not available.

8. The battery charging service system of claim 7, wherein the working device does not charge the battery of the target vehicle, when the remaining battery capacity of the target vehicle is greater than or equal to the third reference value.

9. The battery charging service system of claim 1, wherein the service device is further configured to collect big data about user characteristics including at least one of a driving habit, a driving pattern, a battery usage cycle, a parking position, a parking pattern, or a frequency of battery charging of the user and to periodically provide the battery charging service using the collected big data.

10. A battery charging service method for an electrification vehicle, the battery charging service method comprising:

collecting, by a service device, information of a position and a remaining battery capacity of a user's vehicle;

classifying, by the service device, a target vehicle which needs charging of a battery in a service area based on the position and the remaining battery capacity of the user's vehicle;

transmitting, by the service device, a work instruction to a working device taking charge of the service area;

providing, by the working device, a battery charging service to the target vehicle depending on the work instruction; and first charging, by the working device, the target vehicle, irrespective of whether the target vehicle is located in the service area, when a remaining battery capacity of the target vehicle is less than a first reference value.

11. The battery charging service method of claim 10, wherein the classifying of the target vehicle includes:

dividing the service area based on the position and the remaining battery capacity of the user's vehicle.

12. The battery charging service method of claim 10, wherein the transmitting of the work instruction includes:

transmitting a work list including a position, the remaining battery capacity, a charging target value, and a working time of the target vehicle.

13. The battery charging service method of claim 10, wherein the providing of the battery charging service includes:

recording, by the working device, a work result, when there is no remaining work after completing the charging of the battery of the target vehicle; and transmitting, by the working device, the work result to the service device.

14. The battery charging service method of claim 10, wherein the providing of the battery charging service includes:

moving, by the working device, to a specified power hub depending on the work instruction and loading, by the working device, at least one mobile charger; and differently charging, by the working device, the battery of the target vehicle based on the remaining battery capacity of the target vehicle.

15. The battery charging service method of claim 14, wherein the charging of the battery of the target vehicle further includes:

moving to a position of the target vehicle and charging the battery of the target vehicle when the target vehicle is located in the service area, when the remaining battery capacity of the target vehicle is greater than or equal to the first reference value and is less than a second reference value; and not charging the battery of the target vehicle, when the target vehicle is not located in the service area.

16. The battery charging service method of claim 15, wherein the charging of the battery of the target vehicle further includes:

moving to the position of the target vehicle and charging the battery of the target vehicle when a charging infrastructure is available, when the remaining battery capacity of the target vehicle is greater than or equal to the second reference value and is less than a third reference value; and not charging the battery of the target vehicle, when the charging infrastructure is not available.

17. The battery charging service method of claim 16, wherein the charging of the battery of the target vehicle further includes:

not charging the battery of the target vehicle, when the remaining battery capacity of the target vehicle is greater than or equal to the third reference value.

18. The battery charging service method of claim 10, further comprising:

collecting big data about user characteristics including at least one of a driving habit, a driving pattern, a battery usage cycle, a parking position, a parking pattern, or a frequency of battery charging of the user; and periodically providing the battery charging service using the collected big data.

* * * * *